Aug. 13, 1957 D. E. FOSTER ET AL 2,802,909

NEUTRALIZED RADIO-FREQUENCY AMPLIFIER

Filed Aug. 19, 1955

United States Patent Office 2,802,909
Patented Aug. 13, 1957

2,802,909

NEUTRALIZED RADIO-FREQUENCY AMPLIFIER

Dudley E. Foster, Glendale, and George R. Gieseke, Van Nuys, Calif., assignors to Hazeltine Research, Inc., Chicago, Ill., a corporation of Illinois Application August 19, 1955, Serial No. 529,462

9 Claims. (Cl. 179—171)

*General*

Figure 1:
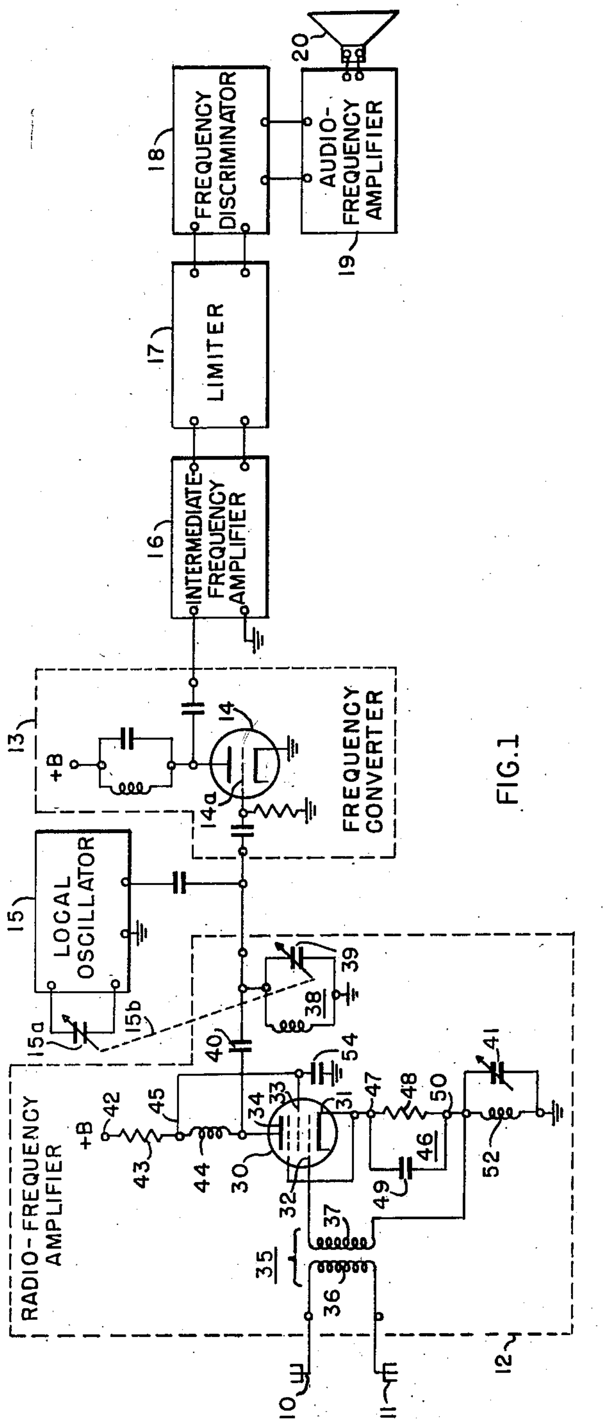

This invention relates to radio-frequency amplifiers and, especially, to such amplifiers which are capable of reducing the amount of local oscillator signal radiated from the receiving antenna of a radio receiver.

In superheterodyne radio receivers, it is well known that some of the signal developed by the local oscillator reaches the antenna of the receiver and, hence, is radiated thereby. This local oscillator radiation is objectionable as it may interfere with neighboring receivers. Accordingly, the Federal Communications Commission has placed restrictions on the amount of local oscillator radiation which is permissible and those skilled in the art have strived to design receivers such that this local oscillator radiation is a minimum.

It has been heretofore proposed to reduce such local oscillator radiation by utilizing a radio-frequency amplifier stage between the local oscillator of the receiver and the receiving antenna. In this manner, the radio-frequency amplifier stage serves to isolate the local oscillator from the receiving antenna and thereby reduce local oscillator radiation. In many applications, however, this modification does not reduce the local oscillator radiation by a sufficient amount. This is especially true at the higher operating frequencies where the interelectrode capacitances of such a radio-frequency amplifier stage are more effective in supplying the local oscillator signal back to the receiving antenna. Thus, it appears that a method of neutralizing the radio-frequency amplifier stage is highly desirable. Neutralization methods commonly used for neutralizing amplifier stages are generally not applicable to the radio-frequency amplifier stage because of the practice of utilizing therein a variable tuning condenser which is grounded directly to the chassis of the radio receiver.

It is an object of the invention, therefore, to provide a new and improved radio-frequency amplifier for reducing the amount of local oscillator signal radiated from the receiving antenna of a radio receiver.

It is another object of the invention to provide a new and improved neutralized radio-frequency amplifier which may be utilized even where the tuning condenser associated with such amplifier is grounded to the receiver chassis.

In accordance with the invention, a neutralized radio-frequency amplifier for reducing the amount of local oscillator signal radiated from the receiving antenna of a radio receiver comprises an electron-discharge device having a cathode, a control electrode, a screen electrode, and an anode. The amplifier also includes input circuit means for coupling the receiving antenna between the control electrode and the cathode. The amplifier further includes an output circuit coupled to the anode and normally exposed to a portion of the local oscillator signal. Additionally, the amplifier includes impedance means coupled to the cathode for forming an impedance bridge with at least three of the interelectrode capacitances of the electron-discharge device such that the input circuit means is located in the null branch of the bridge, the impedance value of the impedance means being selected so that a minimum amount of signal of local oscillator frequency reaches the receiving antenna.

For a better understanding of the present invention, together with other and further objects thereof, reference is had to the following description taken in connection with the accompanying drawing, and its scope will be pointed out in the appended claims.

Figure 2:
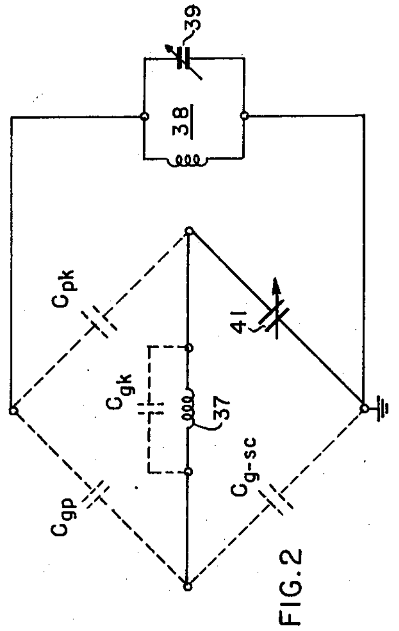

Referring to the drawing:

Fig. 1 is a circuit diagram, partly schematic, of a complete frequency-modulation radio receiver including a neutralized radio-frequency amplifier constructed in accordance with the present invention, and Fig. 2 is an equivalent circuit diagram of the radio-frequency amplifier of Fig. 1 for signals of local oscillator frequency.

*Description and operation of frequency-modulation radio receiver of Fig. 1*

Referring to Fig. 1 of the drawing, there is shown a frequency-modulation radio receiver of the superheterodyne type including a neutralized radio-frequency amplifier constructed in accordance with the present invention. The neutralized radio-frequency amplifier of the present invention is shown in the environment of a frequency-modulation receiver because of the higher operating frequencies (88–108 mc.) of such receivers and because of the fact that at these higher operating frequencies the interelectrode capacitances of the radio-frequency amplifier are more effective in translating signals of local oscillator frequency back to the receiving antenna. It is to be understood, however, that the radio-frequency amplifier of the present invention is not limited to use in receivers of this type and may be utilized in any type of radio receiver where the need therefor is sufficiently great.

Considering now the operation of the frequency-modulation radio receiver of Fig. 1, the frequency-modulated radio-frequency signal from a transmitting station is intercepted by an antenna system 10, 11 and then amplified and translated by a radio-frequency amplifier 12 which is constructed in accordance with the present invention, as will be mentioned more fully hereinafter. The amplified radio-frequency signal at the output of the amplifier 12 is then supplied to a frequency converter 13 or, more specifically, to the control electrode **14*a* of an electron tube 14 included in such frequency converter 13. Also supplied to the control electrode 14*a* is a local oscillator signal from a local oscillator 15. In a well-known manner, the received radio-frequency signal and the local oscillator signal combine to form a signal whose envelope varies at a frequency equal to the difference between the received radio frequency and the local oscillator frequency. As the tube 14 affords rectification of the resultant signal at the control electrode 14*a*, an intermediate-frequency signal having the same frequency modulation as the received signal is supplied to the output terminal of the frequency converter 13**.

This intermediate-frequency signal is then amplified a desired amount in an intermediate-frequency amplifier 16 and then supplied to a limiter 17 and a frequency discriminator 18. The limiter 17 and the frequency discriminator 18 operate in a conventional manner to, respectively, remove any amplitude variations from the intermediate-frequency signal and to convert the intermediate-frequency signal to an audio-frequency signal, the amplitude of which is determined by the instantaneous frequency of the intermediate-frequency signal.

The audio-frequency signal at the output of the frequency discriminator 18 is, in turn, supplied to and amplified by an audio-frequency amplifier 19. The amplified audio signal at the output of this amplifier 19 is then supplied to a loudspeaker 20 for reproducing the desired sound variations.

Tuning of the receiver may be accomplished by varying a suitable tuning condenser, such as the condenser 15*a* associated with the local oscillator 15, and thereby varying the frequency of the local oscillator signal developed thereby. As indicated by the dashed line 15*b*, this tuning condenser 15*a* may be ganged with a corresponding tuning condenser associated with the radio-frequency amplifier 12.

The units 10–20, inclusive, with the exception of the radio-frequency amplifier 12, may be of conventional construction and operation so that a detailed description and explanation of the operation thereof are unnecessary herein.

*Description of neutralized radio-frequency amplifier*

Referring again to Fig. 1 of the drawing, there is represented a neutralized radio-frequency amplifier 12 for reducing the amount of local oscillator signal radiated from the receiving antenna 10, 11 of the radio receiver of Fig. 1. This neutralized radio-frequency amplifier 12 comprises an electron-discharge device or tube 30 having a cathode 31, a control electrode 32, a screen electrode 33, and an anode 34. The radio-frequency amplifier 12 also includes input circuit means for coupling the receiving antenna 10, 11 between the control electrode 32 and the cathode 31. Such input circuit means may include, for example, an antenna input transformer 35, the primary winding 36 of which is adapted to be connected to the receiving antenna 10, 11 and the secondary winding 37 of which is coupled between the control electrode 32 and the cathode 31.

The radio-frequency amplifier 12 further includes an output circuit coupled to the anode 34 and normally exposed to a portion of the local oscillator signal. Such output circuit may include, for example, a tuned output circuit 38 having an adjustable tuning condenser 39 which may be ganged, as indicated by the dashed line 15*b*, to the tuning condenser 15*a* of the local oscillator 15. Such tuned output circuit 38 may be coupled between the anode 34 and a point of fixed reference potential such as, for example, the chassis of the radio receiver which is commonly referred to as "ground." The tuned circuit 38 may be coupled to the anode 34 by way of a coupling condenser 40 which serves to prevent the direct-current operating potential of the tube 30 from being supplied thereto.

The radio-frequency amplifier 12 also includes impedance means coupled to the cathode 31 for forming an impedance bridge with at least three of the interelectrode capacitances of the electron-discharge device 30 such that the input circuit means, represented, for example, by the antenna input transformer 35, is located in the null branch of the bridge, the impedance value of the impedance means being selected so that a minimum amount of signal of local oscillator frequency reaches the receiving antenna 10, 11. Such impedance means may comprise, for example, a neutralizing condenser 41 which is coupled to the cathode 31 for forming an impedance bridge with the anode-to-cathode, the anode-to-control-electrode, and the screen-electrode-to-control-electrode interelectrode capacitances of the electron-discharge tube 30. The capacitance of the neutralizing condenser 41 is selected so as to balance the impedance bridge formed with the mentioned interelectrode capacitances. This neutralizing condenser 41 may be a fixed condenser in which case the value is selected so as to give the desired bridge balance or else it may be a variable condenser, for example, of the trimmer type which may be adjusted to give the desired bridge balance. An adjustable condenser of the trimmer type may be preferable where the characteristics of the radio-frequency amplifier stage vary appreciably from receiver to receiver. The lower side of the neutralizing condenser 41 is connected to the point of fixed reference potential such as, for example, the chassis of the radio receiver.

The radio-frequency amplifier 12 further includes supply circuit means coupled to the anode 34 and the screen electrode 33 for supplying direct-current operating potentials thereto. Such supply circuit means may include, for example, a terminal 42 which is adapted to be connected to a direct-current potential source +B, a decoupling resistor 43, a radio-frequency choke 44, and a conductor 45.

The radio-frequency amplifier 12 may also include a two-terminal self-biasing network 46 having a first terminal 47 thereof connected to the cathode 31 for developing a bias potential for the electron-discharge tube 30, this network 46 having a negligible impedance for signals of local oscillator frequency. Such self-biasing network 46 may include a conventional bias resistor 48 and by-pass condenser 49. A second terminal 50 of this self-biasing network 46 is connected to the ungrounded side of the neutralizing condenser 41.

The radio-frequency amplifier 12 further includes a radio-frequency choke 52 which is connected across the neutralizing condenser 41 for establishing a low-impedance path for direct currents while presenting a high impedance to signals of local oscillator frequency. This radio-frequency choke is necessary in order to complete the return path for the direct-current operating currents of the tube 30.

The radio-frequency amplifier 12 additionally includes a by-pass condenser 54 connected between the screen electrode 33 and the point of fixed reference potential, for example the receiver chassis, for establishing a low-impedance path for signals of local oscillator frequency. This by-pass condenser thus serves to place the screen electrode 33 at chassis ground potential for alternating-current signals of local oscillator frequency as well as those of radio frequency.

*Operation of neutralized radio-frequency amplifier*

Considering the operation of the neutralized radio-frequency amplifier 12 just described, the received radio signal is translated by the antenna input transformer 35 and applied by the secondary winding 37 thereof between the control electrode 32 and the cathode 31 of the tube 30. The tube 30 operates in a well-known manner to amplify this received radio signal. The amplified radio-frequency signal is present at the anode 34 and, hence, across the tuned output circuit 38. In operation, the tuning condenser 39 is adjusted so that the tuned circuit 38 produces a maximum response to received radio signals of a particular desired frequency. These amplified radio-frequency signals across the tuned circuit 38 are supplied to the frequency converter 13 of the receiver as previously discussed.

The self-biasing network 46 coupled to the cathode 31 of the tube 30 operates in a conventional manner to develop a direct-current bias potential thereacross due to the flow of the tube 30 operating currents through the bias resistor 48. Signal components of higher frequencies such as, for example, those of local oscillator frequency, are by-passed or, in other words, short-circuited around the bias resistor 48 by way of the by-pass condenser 49.

The operation of the neutralizing condenser 41 in reducing the amount of local oscillator signal supplied back to the antenna system 10, 11 may best be understood by reference to Fig. 2 of the drawing which is an equivalent circuit diagram for the amplifier circuit 12 for signals of local oscillator frequency. It will thus be noted that the neutralizing condenser 41 constitutes the fourth arm of an impedance bridge of which the other three arms are made up of three of the interelectrode capacitances of the tube 30. Thus, the dashed line condenser $C_{pk}$ of Fig. 2 denotes the interelectrode capacitance between the anode 34 and the cathode 31 of the tube 30. The dashed line condenser $C_{gp}$ of Fig. 2 represents the interelectrode capacitance between the anode 34 and the control electrode 32 of the tube 30. Similarly, the dashed line condenser $C_{g-sc}$ of Fig. 2 represents the interelectrode capacitance between the control electrode 32 and the screen electrode 33 of the tube 30 of Fig. 1. It will thus be apparent that the secondary winding 37 of the antenna input transformer 35 is so positioned in the circuit as to be located in the null branch of this impedance bridge formed by these interelectrode capacitances and the neutralizing condenser 41. It will also be noted that the interelectrode capacitance between the control electrode 32 and the cathode 31, as indicated by the dashed line condenser $C_{gk}$ of Fig. 2, is in parallel with the secondary winding 37 in the null branch of the bridge.

The tuned output circuit 38 which is normally exposed to a portion of the local oscillator signal is effectively coupled across the opposite corners of the impedance bridge of Fig. 2 as shown. Thus, by selecting the value of the neutralizing condenser 41, the impedance bridge may be balanced so that a minimum of current of local oscillator frequency flows through the null branch containing the secondary winding 37 of the antenna input transformer 35. In this manner, the amount of local oscillator signal which is consequently supplied back to the antenna system 10, 11 by the input transformer 35 is reduced to a minimum.

While applicants do not intend to limit the invention to any particular design constants, the following values have been found suitable for a neutralized radio-frequency amplifier as shown in Fig. 1:

| | |
|---|---|
| Choke coil **52** | 10 microhenries. |
| Condenser **40** | 33 micromicrofarads. |
| Condenser **41** | 200 micromicrofarads. |
| Condenser **49** | 100 micromicrofarads |
| Condenser **54** | 100 micromicrofarads. |
| Resistor **43** | 4700 ohms. |
| Resistor **48** | 68 ohms. |
| Tube **30** | ½ 6U8 (pentode section). |

From the foregoing description of the invention, it will be apparent that a neutralized radio-frequency amplifier constructed in accordance with the present invention represents a new and improved means for reducing the amount of local oscillator signal radiated from the receiving antenna of the radio receiver. It should be particularly noted that the present invention makes use of the interelectrode capacitances of the radio-frequency amplifier in order to achieve this reduced local oscillator radiation. This is particularly important in view of the fact that such interelectrode capacitances are usually considered to be a necessary evil which serve no useful purpose.

While the invention has been described with reference to its usefulness in reducing local oscillator radiation, it will be apparent that the teachings of the present invention are also useful for neutralizing an amplifier for the received radio-frequency signals as well, that is to say, the neutralization technique of the present invention may also be utilized to prevent anode-to-control-electrode feedback of the amplified radio-frequency signal thereby to prevent instability or self-oscillation of the amplifier circuit. In this vein, the neutralization technique of the present invention is not limited to radio-frequency amplifier and, hence, may be utilized to neutralize other types of amplifiers where the need therefor is sufficiently great.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A neutralized amplifier for reducing the amount of signal of a predetermined frequency which is supplied back from the output to the input of the amplifier, the amplifier comprising: an electron-discharge device having a cathode, a control electrode, a screen electrode, and an anode; input circuit means coupled between the control electrode and the cathode; an output circuit coupled to the anode and normally exposed to a portion of the signal of predetermined frequency; and impedance means coupled to the cathode for forming an impedance bridge with at least three of the interelectrode capacitances of the electron-discharge device such that the input circuit means is located in the null branch of the bridge, the impedance value of the impedance means being selected so that a minimum amount of the signal of predetermined frequency reaches the input circuit means.

2. A neutralized radio-frequency amplifier for reducing the amount of local oscillator signal radiated from the receiving antenna of a radio receiver, the radio-frequency amplifier comprising: an electron-discharge device having a cathode, a control electrode, a screen electrode, and an anode; input circuit means for coupling the receiving antenna between the control electrode and the cathode; an output circuit coupled to the anode and normally exposed to a portion of the local oscillator signal; and impedance means coupled to the cathode for forming an impedance bridge with at least three of the interelectrode capacitances of the electron-discharge device such that the input circuit means is located in the null branch of the bridge, the impedance value of the impedance means being selected so that a minimum amount of signal of local oscillator frequency reaches the receiving antenna.

3. A neutralized radio-frequency amplifier for reducing the amount of local oscillator signal radiated from the receiving antenna of a radio receiver, the radio-frequency amplifier comprising: an electron-discharge device having a cathode, a control electrode, a screen electrode, and an anode; an antenna input transformer, the primary winding of which is adapted to be connected to the receiving antenna and the secondary winding of which is coupled between the control electrode and the cathode; an output circuit coupled to the anode and normally exposed to a portion of the local oscillator signal; and impedance means coupled to the cathode for forming an impedance bridge with at least three of the interelectrode capacitances of the electron-discharge device such that the antenna input transformer is located in the null branch of the bridge, the impedance value of the impedance means being selected so that a minimum amount of signal of local oscillator frequency reaches the receiving antenna.

4. A neutralized radio-frequency amplifier for reducing the amount of local oscillator signal radiated from the receiving antenna of a radio receiver, the radio-frequency amplifier comprising: an electron-discharge device having a cathode, a control electrode, a screen electrode, and an anode; input circuit means for coupling the receiving antenna between the control electrode and the cathode; an output circuit coupled to the anode and normally exposed to a portion of the local oscillator signal; and a neutralizing condenser coupled to the cathode for forming an impedance bridge with at least three of the interelectrode capacitances of the electron-discharge device such that the input circuit means is located in the null branch of the bridge, the impedance value of the neutralizing condenser being selected so that a minimum amount of signal of local oscillator frequency reaches the receiving antenna.

5. A neutralized radio-frequency amplifier for reducing the amount of local oscillator signal radiated from the receiving antenna of a radio receiver, the radio-frequency amplifier comprising: an electron-discharge device having a cathode, a control electrode, a screen electrode, and an anode; input circuit means for coupling the receiving antenna between the control electrode and the cathode; an output circuit coupled to the anode and normally exposed to a portion of the local oscillator signal; and a neutralizing condenser coupled to the cathode for forming an impedance bridge with the anode-to-cathode, anode-to-control-electrode, and screen-electrode-to-control-electrode interelectrode capacitances of the electron-discharge device such that the input circuit means is located in the null branch of the bridge, the impedance value of the neutralizing condenser being selected so that a minimum amount of signal of local oscillator frequency reaches the receiving antenna.

6. A neutralized radio-frequency amplifier for reducing the amount of local oscillator signal radiated from the receiving antenna of a radio receiver, the radio-frequency amplifier comprising: an electron-discharge device having a cathode, a control electrode, a screen electrode, and an anode; input circuit means for coupling the receiving antenna between the control electrode and the cathode; an output circuit coupled to the anode and normally exposed to a portion of the local oscillator signal; a neutralizing condenser coupled between the cathode and a point of fixed reference potential for forming an impedance bridge with at least three of the interelectrode capacitances of the electron-discharge device such that the input circuit means is located in the null branch of the bridge, the impedance value of the neutralizing condenser being selected so that a minimum amount of signal of local oscillator frequency reaches the receiving antenna; and a radio-frequency choke connected across the neutralizing condenser for establishing a low-impedance path for direct currents while presenting a high impedance to signals of local oscillator frequency.

7. A neutralized radio-frequency amplifier for reducing the amount of local oscillator signal radiated from the receiving antenna of a radio receiver, the radio-frequency amplifier comprising: an electron-discharge device having a cathode, a control electrode, a screen electrode, and an anode; supply-circuit means coupled to the anode and the screen electrode for supplying operating potentials thereto; a neutralizing condenser coupled between the cathode and a point of fixed reference potential; impedance means connected across the neutralizing condenser for establishing a path for direct currents while presenting a high impedance to signals of local oscillator frequency; a by-pass condenser connected between the screen electrode and the point of fixed reference potential for establishing a low-impedance path for signals of local oscillator frequency; input circuit means for coupling the receiving antenna between the control electrode and the cathode; and an output circuit coupled between the anode and the point of fixed reference potential and normally exposed to a portion of the local oscillator signal; the impedance value of the neutralizing condenser being selected so that a minimum amount of signal of local oscillator frequency reaches the receiving antenna.

8. A neutralized radio-frequency amplifier for reducing the amount of local oscillator signal radiated from the receiving antenna of a radio receiver, the radio-frequency amplifier comprising: an electron-discharge device having a cathode, a control electrode, a screen electrode, and an anode; supply-circuit means coupled to the anode and the screen electrode for supplying operating potentials thereto; a neutralizing condenser coupled between the cathode and a point of fixed reference potential; a radio-frequency choke connected across the neutralizing condenser for establishing a low-impedance path for direct currents while presenting a high impedance to signals of local oscillator frequency; a by-pass condenser connected between the screen electrode and the point of fixed reference potential for establishing a low-impedance path for signals of local oscillator frequency; an antenna input transformer, the primary winding of which is adapted to be connected to the receiving antenna and the secondary winding of which is coupled between the control electrode and the cathode; and an output circuit coupled between the anode and the point of fixed reference potential and normally exposed to a portion of the local oscillator signal; the impedance value of the neutralizing condenser being selected so that a minimum amount of signal of local oscillator frequency reaches the receiving antenna.

9. A neutralized radio-frequency amplifier for reducing the amount of local oscillator signal radiated from the receiving antenna of a radio receiver, the radio-frequency amplifier comprising: an electron-discharge device having a cathode, a control electrode, a screen electrode, and an anode; supply-circuit means coupled to the anode and the screen electrode for supplying operating potentials thereto; a two-terminal self-biasing network having a first terminal thereof connected to the cathode for developing a bias potential for the electron-discharge device and having a negligible impedance for signals of local oscillator frequency; a neutralizing condenser connected between a second terminal of the self-biasing network and a point of fixed reference potential; a radio-frequency choke connected across the neutralizing condenser for establishing a low-impedance path for direct currents while presenting a high impedance to signals of local oscillator frequency; a by-pass condenser connected between the screen electrode and the point of fixed reference potential for establishing a low-impedance path for signals of local oscillator frequency; an antenna input transformer, the primary winding of which is adapted to be connected to the receiving antenna and the secondary winding of which is coupled between the control electrode and the second terminal of the self-biasing network; and a tuned output circuit coupled between the anode and the point of fixed reference potential and normally exposed to a portion of the local oscillator signal; the impedance value of the neutralizing condenser being selected so that a minimum amount of signal of local oscillator frequency reaches the receiving antenna.

References Cited in the file of this patent

UNITED STATES PATENTS

| | | |
|---|---|---|
| 2,156,358 | Sinninger | May 2, 1939 |

FOREIGN PATENTS

| | | |
|---|---|---|
| 453,400 | Great Britain | Sept. 10, 1936 |
| 534,104 | Great Britain | Feb. 27, 1941 |